United States Patent
Huo et al.

(10) Patent No.: US 9,544,031 B2
(45) Date of Patent: Jan. 10, 2017

(54) METHOD OF VARIABLE RATE SINGLE USER AND MULTI USER MIMO FEEDBACK FOR MOBILE COMMUNICATIONS SYSTEM

(71) Applicants: ZTE Corporation, Guangdong (TW); ZTE (USA) Inc., Austin, TX (US)

(72) Inventors: David Huo, Newtown, NJ (US); Shupeng Li, Iselin, NJ (US); Yifei Yuan, Iselin, NJ (US)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 0 days.

(21) Appl. No.: 14/667,738

(22) Filed: Mar. 25, 2015

(65) Prior Publication Data

US 2016/0013842 A1    Jan. 14, 2016

Related U.S. Application Data

(63) Continuation of application No. 13/521,960, filed as application No. PCT/US2011/020815 on Jan. 11, 2011, now abandoned.

(60) Provisional application No. 61/294,197, filed on Jan. 12, 2010.

(51) Int. Cl.
| | | |
|---|---|---|
| *H04W 4/08* | (2009.01) |
| *H04B 7/04* | (2006.01) |
| *H04L 25/03* | (2006.01) |
| *H04W 24/08* | (2009.01) |
| *H04W 72/04* | (2009.01) |
| *H04L 5/00* | (2006.01) |
| *H04L 25/02* | (2006.01) |

(52) U.S. Cl.
CPC .......... *H04B 7/0417* (2013.01); *H04B 7/0452* (2013.01); *H04B 7/0456* (2013.01); *H04L 25/03343* (2013.01); *H04W 24/08* (2013.01); *H04W 72/0466* (2013.01); *H04L 5/0007* (2013.01); *H04L 25/0204* (2013.01)

(58) Field of Classification Search
CPC ........................... H04B 7/0456; H04B 7/0639
See application file for complete search history.

(56) References Cited

U.S. PATENT DOCUMENTS

| | | |
|---|---|---|
| 4,423,824 A | 1/1984 | Varndell |
| 4,611,854 A | 9/1986 | Pfeiffer |
| 5,477,640 A | 12/1995 | Holtkamp, Jr. |
| 5,899,382 A | 5/1999 | Hayes et al. |
| 7,263,952 B1 | 9/2007 | Tsengas |
| 7,687,037 B2 | 3/2010 | Wheatley et al. |
| 7,687,038 B2 | 3/2010 | Wheatley et al. |
| 2007/0075159 A1 | 4/2007 | Lin |
| 2008/0037669 A1* | 2/2008 | Pan ...................... H04B 7/0417 375/260 |
| 2008/0179424 A1 | 7/2008 | Cheung |
| 2009/0197623 A1* | 8/2009 | Oota ................... H04W 72/082 455/509 |

(Continued)

*Primary Examiner* — Andrew Lai
*Assistant Examiner* — Zhiren Qin
(74) *Attorney, Agent, or Firm* — Drinker Biddle & Reath LLP

(57) ABSTRACT

A spatial channel state information (CSI) feedback technique is incorporated into multiple-input multiple-output mobile communications technologies. User equipment (UE) channel conditions are measured and, based on the measurements, codebook subsets are selected to which indices are assigned and fed back to a base station.

16 Claims, 3 Drawing Sheets

(56) References Cited

U.S. PATENT DOCUMENTS

2010/0173659 A1*  7/2010  Shin ................... H04B 7/0452
                                              455/500
2011/0007643 A1*  1/2011  Liang .................. H04L 5/0053
                                              370/252

* cited by examiner

METHOD OF VARIABLE RATE SINGLE USER AND MULTI USER MIMO FEEDBACK FOR MOBILE COMMUNICATIONS SYSTEM

FIELD OF THE INVENTION

The present invention relates to wireless communications systems. More specifically, it relates to generating feedback for multiple-input multiple-output (MIMO) systems.

BACKGROUND OF THE INVENTION

Multiple-input multiple-output (MIMO) is a family of techniques that utilize multiple antennas at the transmitter and/or at the receiver to exploit the spatial dimension in order to improve data throughput and transmission reliability. The data throughput can be increased by either spatial multiplexing or beamforming. Spatial multiplexing allows multiple data streams to be transmitted simultaneously to the same user through parallel channels in the MIMO setting. This is especially true for diversity antennas where spatial correlation is low between antennas (both at the transmitter and the receiver). Beamforming helps to enhance the signal-to-interference-plus-noise ratio (SINR) of the channel, thus improving the channel rate. Such SINR improvement is achieved by proper weighting over multiple transmit antennas and the weight calculation can be based on either long-term measurement (e.g., open-loop) or via feedback (e.g., closed-loop). Closed-loop transmit weighting is often called precoding in the context of MIMO study.

References to background prior art include the following publications:
(1) 3GPP TR 36.814, v1.1.1, "Further Advancements for E-UTRA, Physical Layer Aspects", June 2009; and
(2) 3GPP TS 36.211, "Evolved Universal Terrestrial Radio Access (E-UTRA); Physical Channels and Modulation".

A MIMO broadcast channel can be described as follows, where there is K receiver and the transmitter has M>1 antennas:

$$y_i = h_i \cdot x + n_i, i=1,2,\ldots K \quad (0.1)$$

with $E[\|x\|^2] < P$.

When linear precoding is used, the transmitter multiplies the signal intended for each user with a beamforming vector, and transmits the sum of these vector signals:

$$y_i = \sum_{j=1}^{K} h_i \cdot v_i \cdot s_i + n_i, \quad (0.2)$$

where v denotes the beamforming vector.

Beamforming vectors can be based on the zero-forcing principle, in which the beamforming vector for user equipment (UE) is chosen to be orthogonal to the channel vector of all other users.

Linear precoding performance depends on the choice of beamforming vectors, which is decided from the channel feedback from each UE. To achieve the capacity of a multi-user MIMO channel, the accurate channel state information is necessary at the transmitter. However, in real systems, receivers feedback the partial channel state information to the transmitter in order to efficiently use the uplink feedback channel resource, which is the multi-user MIMO system with limited feedback precoding.

When there is an imperfection of this channel knowledge, some degree of multiuser interference is inevitably introduced, leading to performance degradation. An example of such imperfection is quantization. Quantization error is related to the bits used. It can be seen that quantization error $\zeta$ can be bounded as follows:

$$\left(\frac{M-1}{M}\right) \cdot 2^{-\frac{B}{M-1}} < \zeta < 2^{-\frac{B}{M-1}}, \quad (0.3)$$

where M is the total number of transmit antennas and B is the total bits used to quantize the feedback. To further analyze and quantify the performance degradation caused by imperfect feedback, system rate loss can be defined as follows:

$$\Delta\delta(P) = \frac{1}{M}\sum_{j=1}^{K}[R(P) - \overline{R}(P)]. \quad (0.4)$$

It can be shown that:

$$\Delta\delta(P) < K \cdot \log_2\left(1 + P \cdot 2^{-\frac{B}{M-1}}\right). \quad (0.5)$$

According to Equation 0.5, rate loss is an increasing function of the system P: signal-to-noise ration (SNR). In other words, in order to maintain a bounded rate loss, the number of feedback bits per mobile needs to be scaled. This can be expressed in another format: If we fix the feedback bits per UE, then the rate that each UE can be achieved by quantized feedback is bounded by $$R_{FB}(P) \leq M\left(1 + \frac{B + \log_2 e}{M - 1} + \log_2(M-2) + \log_2 e\right) \quad (0.6)$$

as SNR is approaching infinity.

SUMMARY OF THE INVENTION

The present invention provides spatial CSI feedback for MIMO operation of unexpectedly improved accuracy while keeping the feedback overhead as low as possible.

In accordance with an aspect, the invention is a method and system for generating feedback in a MIMO system that includes performing measurements of channel conditions; selecting subsets of codebooks based on the measurements; selecting codewords from the codebooks based on certain criteria; assigning indices to the codewords; and feeding back the indices.

In another aspect, the invention is a UE configured to make a channel condition measurement and report the channel condition measurement to a base station. The UE can be further configured to measure an instantaneous radio channel and choose codewords from a subset of a codebook corresponding to the feedback rate region classification. In some embodiments, the UE is also configured to decide a feedback rate region classification for the UE based on the channel condition measurement and a predefined threshold. In some aspects, the UE is configured to choose codewords from a subset of a codebook corresponding to the feedback rate region classification, based on a minimal distance of a codeword and a channel vector or a maximal capacity criterion. Finally, the UE can be configured to feed back the codewords to a base station.

In another aspect, the invention is a base station configured to decide a feedback rate region classification for a UE based on a channel condition measurement and convey the feedback rate region classification to the UE through downlink signaling. The base station can be further configured to calculate precoding matrices.

As noted, fixed feedback rate systems achieve only a bounded throughput. To realize full multiplexing gain, the feedback rate is adaptively increased to the system SNR. Accordingly, the feedback method of the present invention divides a cell into a plurality of feedback rate regions and each region employs a subset of a codebook having a different characterization based on average radio channel conditions. Different characterization includes granularity and spatial signature. For example, according to the invention the cell is divided into a cell center (high feedback rate) region and a cell edge (low feedback rate) region. In the low feedback rate region, for example, a Release 8 based 4-bit codebook is used, while in the high feedback rate region, a 6-bit codebook is employed.

According to an embodiment of the present invention, there is provided a method for multiple-input multiple-output (MIMO) to generate feedback, which includes:
(a) performing at least one measurement of a channel condition;
(b) selecting a subset of a predetermined codebook based on the measurement of the channel metric, the selected codebook subset including a plurality of codewords and a plurality of respective indices;
(c) selecting a particular one of the codewords in the selected codebook subset based on a certain criterion;
(d) assigning a codebook subset index to the selected codeword; and
(e) transmitting a feedback signal including the assigned codebook subset index.

According to a preferred embodiment, the method of the present invention further includes dividing the cell area into a plurality of feedback rate regions according to long term radio channel conditions. More preferably, radio channel conditions are determined by mobile radio channel measurement reporting.

In another embodiment, indication of the feedback rate region is determined by predefined radio channel thresholds known at the mobile station or by transmission of certain messages from a base station.

In a further embodiment, a plurality of codewords is partitioned into multiple sub codebooks, each of which corresponds to one of the feedback regions. Preferably, each sub codebook has different feedback granularity.

In yet another embodiment, indices of codewords are selected so that the distance between the quantized composite spatial CSI and the floating-point composite spatial CSI is minimized.

BRIEF DESCRIPTION OF THE FIGURES

The invention is described in detail by reference to the three figures of the drawings.

DETAILED DESCRIPTION OF THE INVENTION

Figure 1:
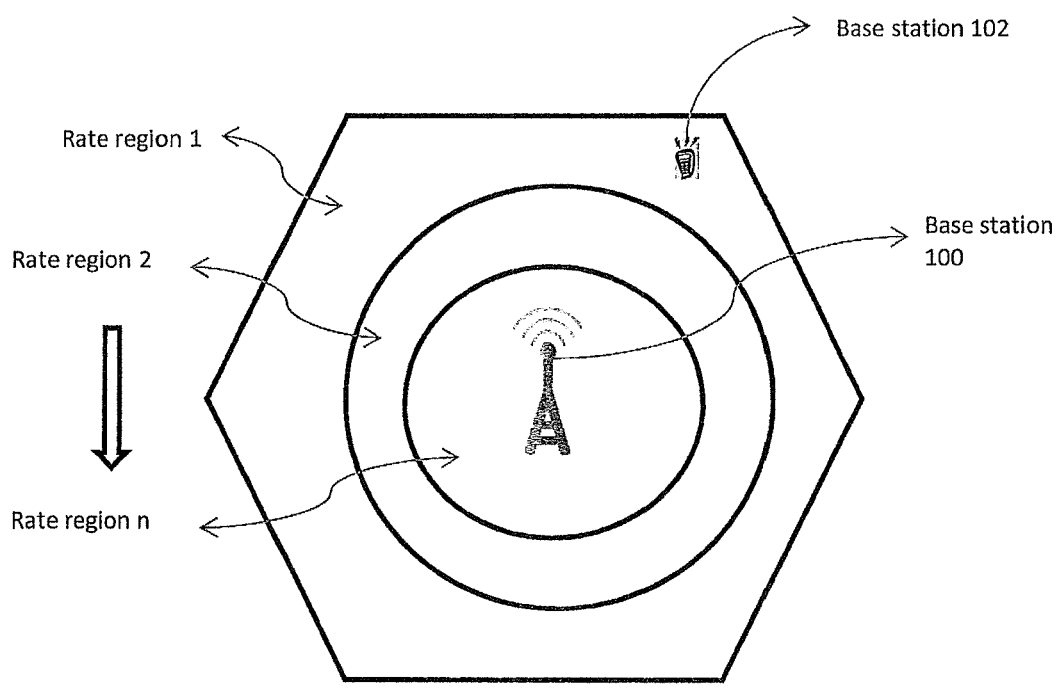
FIG. 1 depicts a cell divided into several feedback rate regions according to an embodiment of the present invention.
Figure 2:
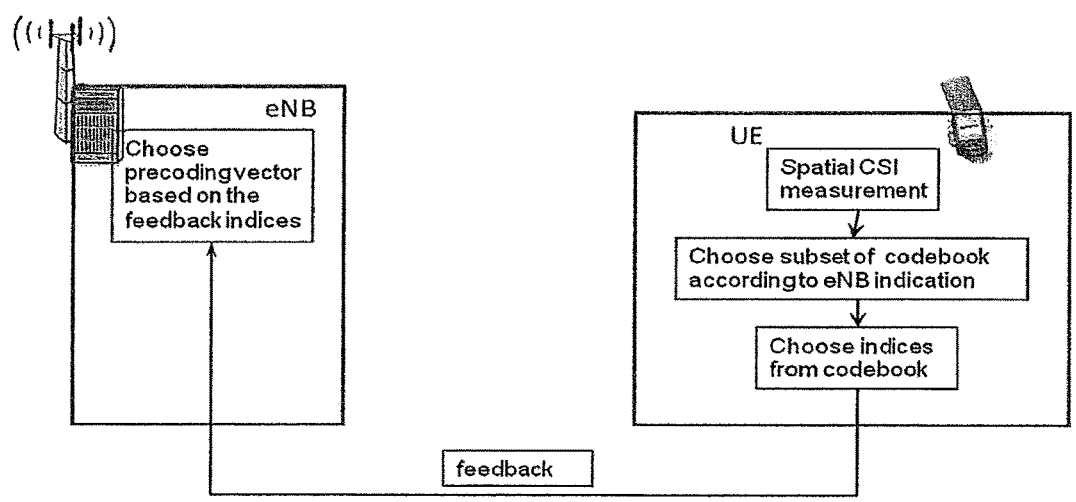
FIG. 2 is a block diagram which depicts and describes the choices to be made at the base station according to an embodiment of the present invention.

FIG. 1 depicts Rate regions 1, 2, and n; Base station 100; and Base station 102. There are two principal entities in this embodiment. In FIG. 2, eNB denotes the Base station and UE denotes the mobile. In this downlink example, data is transmitted from eNB to UE; and the feedback is from UE to eNB. Both eNB and UE have multiple antennas to carry out precoded MIMO. Codebooks are known for both eNB and UE based on air-interface specifications. The actual codebooks to be used depend on antenna configurations and deployment environment, and are usually decided by the network. That information can be notified to the UE via semi-static radio resource control (RRC) signaling.

At the UE, the radio channel condition is measured first. The measurement is reported to the base station and used when deciding which feedback rate region the UE will be classified. This feedback rate region information is conveyed to the UE by the base station through a downlink signaling form known in the art. Alternatively, the UE can decide the feedback region itself based on the radio channel measurement and a certain predefined threshold known both to the eNB and UE.

As shown in FIG. 2, after the feedback region is decided, the UE will measure instantaneous radio channel, then choose certain codewords from the subset of a codebook corresponding to the feedback region. There are various methods which can be used when choosing certain codewords from a known set of codewords. As a non-limiting example, the choice can be based on minimal distance of the codeword and the channel vector or it can be based on maximal capacity criterion. Upon receiving the feedback, i.e., codeword(s), from the UE, the eNB can calculate the precoding matrices according to methods known in the art.

In a simulation study, signal-to-leakage-and-noise ratio (SLNR) criteria are used to determine the precoders in multi-user MIMO (MU-MIMO). These criteria are referenced in M. Sadek, A. Tarighat, and A. H. Sayed, "A leakage-based precoding scheme for downlink multi-user MIMO channels," *IEEE Trans. Wireless Commun.*, vol. 6, no. 5, pp. 1711-1721, May 2007, and also in 3GPP, R1-092635, "Feedback comparison in supporting LTE-A MU-MIMO and CoMP operations", Motorola, RAN1#57bis, Los Angeles, USA, June 2009.

In the case of two-user MIMO, the precoders for User 1 and User 2 can be calculated as $$F_1 = eig\left(\left(\sigma_n^2 I_M + \frac{P_t}{2M} H_2^H H_2\right)^{-1} H_1^H H_1\right)$$

$$F_2 = eig\left(\left(\sigma_n^2 I_M + \frac{P_t}{2M} H_1^H H_1\right)^{-1} H_2^H H_2\right)$$

In a beamforming antenna configuration with rank=1 per user, only one vector (normally corresponding to the strongest eigen-mode) is used as the column vectors to construct precoding vectors.

The simulation is carried out in semi-analytical fashion. Particularly for MU-MIMO, the steps are as follows.
1. Set up the geometry points, e.g., from −5 dB to 25 dB with step size of 1 dB.

2. Each time, generate spatial channels of two independent users, based on certain channel model(s).
3. Quantize the covariance matrix R by either element-wise quantization, or through vector quantization of the eigen-mode.
4. Determine the precoders based on the Equations for User 1 and User 2 set forth above.
5. Calculate the sum-rate over the two users, the instantaneous channel rate of each user is based on 64-QAM constrained capacity, meaning that channel quality indicator (CQI) feedback, link adaptation, and channel decoding are perfect. See G. Ungerboeck, "Channel coding with multilevel/phase signals," *IEEE Trans. Info. Theory.*, vol. IT-28, no. 1, pp. 55-67, January 1982.

The procedure from Step 2 to Step 5 is looped multiple times, each with an independent spatial channel realization. The calculated capacities are of an ergodic nature. Spatial channel model (SCM) Suburban Macro (SMa) scenario is assumed. See 3GPP, TR 25.996 v7.0.0 (2007-06), "Spatial channel model for multiple input multiple output (MIMO) simulations." For each channel realization, the spatial CSI feedback is at subcarrier level. In MU-MIMO, the two users are forced to do MU-MIMO, even occasionally the channel realizations lead to poor separation of eigenmodes between users and thus may degrade the sum rate. In other words, MU-MIMO mode never falls back to single-user MIMO (SU-MIMO) mode.

A uniform linear array (ULA) of four vertical-polarization antennas are assumed at the transmitter. The antenna spacing is $0.5\lambda$. The receiver is equipped with two antennas. In the case of element-wise quantization of matrix "Ri," as described in 3GPP, R1-092635, "Feedback comparison in supporting LTE-A MU-MIMO and CoMP operations," Motorola, RAN1#57bis, Los Angeles, USA, June 2009, 3 bits and 5 bits are used for the amplitude and the phase of each element. A smaller number of bits is allocated for the amplitude than for the phase information because the entire matrix is first normalized by the amplitude of the largest element, a procedure that reduces the dynamic range of the elements in different channel realizations. Ignoring the number of bits for this normalization, the element-wise quantization requires $3\times4+(3+5)\times6=60$ bits. Quantization levels for amplitude and phase are listed in Table 1, below. The levels are not necessarily optimized. Rather, the quantization levels are intuitively selected to capture the general statistics anticipated for the matrix elements.

SU-MIMO is also simulated to see the gains of MU-MIMO and the sensitivity to feedback accuracies. Rank adaptation is enabled between rank=2 and rank=1. In the precoding matrix index (PMI) approach, the 4-bit Rel. 8 LTE codebook is used that has entries for both beamforming and diversity scenarios.

TABLE 1

Simulation parameters

| Parameters | Values |
|---|---|
| Channel model | SCM, Suburban Macro (SMa) [6] |
| Antenna configuration | MIMO 4 × 2 |
| | Transmitter: ULA 4 V, spacing = 0.5 λ |
| | Receiver: two antennas |
| Rank prediction | Implemented only in SU-MIMO, ideal |
| Max. rank per UE | 1 for MU-MIMO, 2 for SU-MIMO |
| Link level performance | SINR to capacity mapping, 64-QAM constrained capacity |

TABLE 1-continued

Simulation parameters

| Parameters | Values |
|---|---|
| Receiver type | Minimum Mean Square Error (MMSE) |
| Link adaptation | Ideal, SINR of UE is known at Tx |
| Cross-user interference modeling (MU-MIMO) | Explicitly modeled |
| Time/freq resolution of spatial CSI feedback | Snap-shot in time, per-subcarrier in frequency |
| Number of users simulated/multiplexed | 2 |
| Amplitude quantization levels | [0.2, 0.3, 0.4, 0.5, 0.6, 0.7, 0.8, 0.925] |
| Phase quantization levels | Uniform over $[-\pi, \pi]$, step size of $\pi/16$ |
| Codebook for SU/MU-MIMO | Rel. 8 codebook (4-bit) |
| | 6-bit codebook (for rank = 1) |
| Geometry Threshold for feedback rate region | 5 dB |

Figure 3:
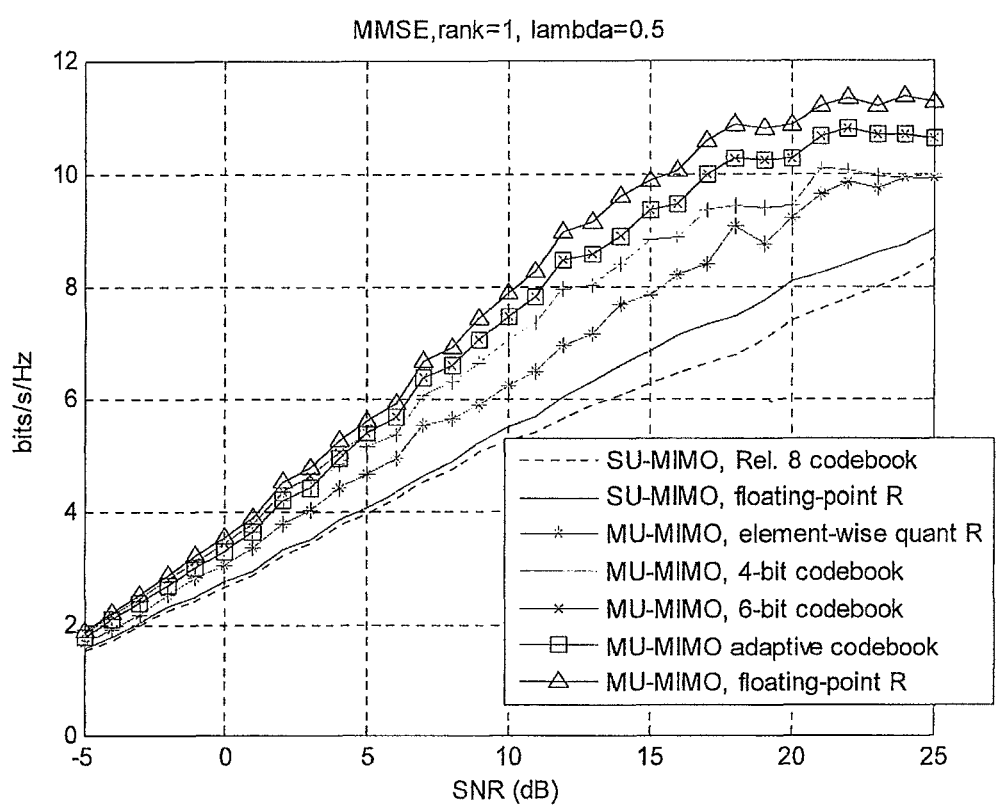
FIG. 3 shows the surprisingly improved performance of the present invention.

The ergodic-constrained capacities of SU-MIMO and MU-MIMO are compared in FIG. 3. Generally, MU-MIMO shows more gain; that is, it outperforms SU-MIMO as the SNR increases. The performance of SU-MIMO is the lowest, particularly with Rel-8 codebook. Even at SNR=25 dB, the SU-MIMO capacity is still significantly lower than 12 bits/s/Hz which is the highest achievable throughput of two stream multiplexing. Such shortfall indicates that in a beamforming antenna configuration under a SCM Suburban Macro environment, the rank of the spatial channel is often less than two. MU-MIMO can closer approach 12 bits/s/Hz, by taking advantage of the rather independent channels between users. The highest capacity is MU-MIMO with floating-point R feedback, followed by 6-bit codebook, Rel-8 4-bit codebook, and element-wise quantization of R. Considering many more bits for element-wise quantization, codebook based feedback appears more efficient. The results show that the variable size adaptive codebook feedback method of performance is almost exactly as good as the 6-bit enhanced feedback scheme.

Many modifications, alterations, and embodiments may be apparent to those skilled in the art based on the foregoing description. For example, based on the results shown, codebooks with finer granularities than Rel 8 are considered for use in accordance within the scope of the present invention.

The invention claimed is:

1. A method to generate feedback in a multiple-input multiple-output (MIMO) system which comprises:
   performing at least one measurement of a channel condition;
   selecting a subset of a codebook based on the at least one measurement, the subset comprising a plurality of codewords and a plurality of indices;
   selecting one of the plurality of codewords based on a certain criterion and assigning one of the plurality of indices to the one of the plurality of codewords, wherein the one of the plurality of indices is assigned so a distance between a quantized composite spatial channel state information (CSI) and a floating-point composite spatial CSI minimized; and
   transmitting a feedback signal comprising the one of the plurality of indices.

2. The method of claim 1, wherein the codebook is predetermined.

3. The method of claim 1, further comprising dividing a cell into a plurality of feedback rate regions, wherein each of the plurality of feedback rate regions uses a subset of a codebook having a different characterization based on average radio channel conditions.

4. The method of claim 1, further comprising dividing a cell area into a plurality of feedback rate regions according to long term radio channel conditions.

5. The method of claim 4, wherein the long term radio channel conditions are determined by mobile radio channel measurement reporting.

6. The method of claim 1, further comprising determining an indication of a feedback rate region, wherein the determining is by predefined radio channel thresholds known at a mobile station and by transmission of certain messages from a base station.

7. The method of claim 1, further comprising partitioning a plurality of codewords into multiple sub-codebooks, each sub-codebook corresponding to one of a plurality of feedback regions.

8. The method of claim 7, wherein each sub-codebook has a different feedback granularity.

9. A system to generate feedback in a multiple-input multiple-output (MIMO) system which comprises:
 a first circuit to perform at least one measurement of a channel condition;
 a second circuit to select a subset of a codebook based on the at least one measurement, the subset comprising a plurality of codewords and a plurality of indices;
 a third circuit to select one of the plurality of codewords based on a certain criterion and to assign one of the plurality of indices to the one of the plurality of codewords, wherein the one of the plurality of indices is assigned so a distance between a quantized composite spatial channel state information (CSI) and a floating-point composite spatial CSI minimized, and
 a transmitter to transmit a feedback signal comprising the one of the plurality of indices.

10. The system of claim 9, wherein the codebook is predetermined.

11. The system of claim 9, further comprising a fourth circuit to divide a cell into a plurality of feedback rate regions, wherein each of the plurality of feedback rate regions uses a subset of a codebook having a different characterization based on average radio channel conditions.

12. The system of claim 9, further comprising a fourth circuit to divide a cell area into a plurality of feedback rate regions according to long term radio channel conditions.

13. The system of claim 12, wherein the long term radio channel conditions are determined by mobile radio channel measurement reporting.

14. The system of claim 9, further comprising a fifth circuit to determine an indication of a feedback rate region, wherein the determining is by predefined radio channel thresholds known at a mobile station and by transmission of certain messages from a base station.

15. The system of claim 9, further comprising a sixth circuit to partition a plurality of codewords into multiple sub-codebooks, each sub-codebook corresponding to one of a plurality of feedback regions.

16. The system of claim 15, wherein each sub-codebook has a different feedback granularity.

* * * * *